(No Model.)
W. S. SHIPE.
CONSTRUCTION OF BOILERS.
No. 473,167. Patented Apr. 19, 1892.
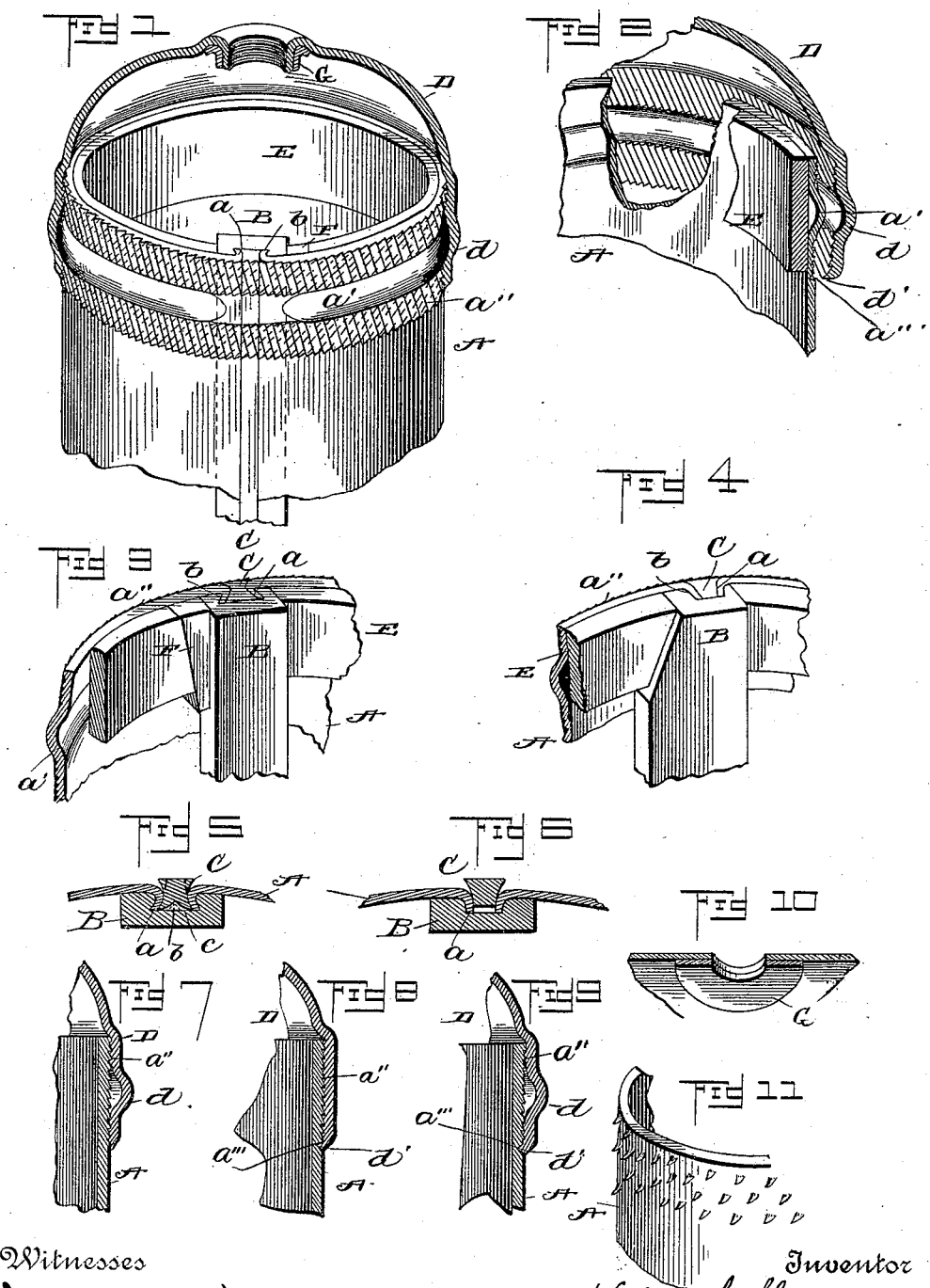
Witnesses
John Lourie
F. E. Robertson
Inventor
Walter S. Shipe
By T. J. W. Robertson
Attorney

UNITED STATES PATENT OFFICE.

WALTER S. SHIPE, OF MINERVA, OHIO.

CONSTRUCTION OF BOILERS.

SPECIFICATION forming part of Letters Patent No. 473,167, dated April 19, 1892.

Application filed June 5, 1891. Serial No. 395,191. (No model.)

*To all whom it may concern:*

Be it known that I, WALTER S. SHIPE, a citizen of the United States, residing at Minerva, in the county of Stark and State of Ohio, have invented certain new and useful Improvements in the Construction of Boilers, of which the following is a specification, reference being had therein to the accompanying drawings.

This improvement relates to that class of boilers shown in my patent, No. 453,946, dated June 9, 1891; and it consists in the peculiar construction, arrangement, and combinations of parts hereinafter more particularly shown and described and then definitely claimed.

In the accompanying drawings, Figure 1 is a perspective view of one end of a boiler constructed according to my improvement with half of the head removed. Fig. 2 is a sectional detail of the same before the head and body are united. Fig. 3 is a detail showing the preferable manner of securing a strengthening-ring in place and the manner of uniting the cylinder. Fig. 4 shows a modification of the same features. Fig. 5 is a detail of the longitudinal joint shown in Fig. 3 before completion. Fig. 6 is a similar view of the same joint shown in Fig. 4, also before completion. Figs. 7, 8, and 9 show various modifications of the joint between the head and cylinder. Fig. 10 is a detail representing part of the head and a washer before they are permanently united. Fig. 11 shows a modified form of the end of the cylinder.

Referring now to the details of the drawings by letter, A represents the metal whose edges are to be united, being in this instance the cylinder of a kitchen-boiler.

B is the uniting-strip, preferably formed with a dovetail recess $b$, into which the edges $a$ of the plate A are to be inserted, said edges having been previously turned down for this purpose, forming hooks, as represented in Figs. 1, 2, and 3.

C represents a calking-piece, (preferably having concave sides,) which is originally formed to loosely fit the space between the turned-in edges $a$ of the plate A, so as to be readily inserted, or it may be made rather tight and then driven in; but I prefer to make it of such a relative size that it may be inserted without much force. After the calking-piece has been inserted, as shown in Fig. 5, I set the cylinder on a suitable mandrel and in any appropriate or convenient manner force down the calking-piece C, expanding the same laterally until it has completely filled the space between the turned-in edges of the plate, forcing said edges into close and intimate contact with the walls of the recess $b$ and depressing the top of the calking-piece until the same is flush with the top of the plate A, so as to substantially agree with the surface of the cylinder, or nearly so. The spreading of the bottom of the calking-piece will be facilitated by the split or groove $c$ made in the bottom of the same, as shown in Fig. 5. There may be or not, as desired, a projection at the bottom of the groove in the piece B, as shown in dotted lines in the same figure, to assist in spreading the bottom of the calking-piece.

I sometimes make the calking-piece narrowed at the top, as shown in dotted lines in Fig. 5, but prefer the form shown in full lines, and I may sometimes make the strip and calking-piece as shown in Fig. 6, in which the calking-piece C is of substantially wedge shape, but preferably with sides curved inward, in which case the calking-piece is inserted from above, as shown in said figure, and then forced down into the position and shape shown in Fig. 4. The ends of the cylinder may be made with a bead $a'$, as shown in Figs. 1, 2, and 3, or without, as shown in Figs. 7, 8, and 9; but it should not extend quite all the way around, but should decrease gradually toward the edges, as shown in Fig. 1. The ends of the cylinder may or may not be provided with a series of cuts or fine grooves $a''$, as shown in Figs. 1, 2, 3, 7, 8, and 9, and the inside of the heads D may have similar cuts or grooves, as shown in Fig. 2, but arranged so as to cross those on the cylinder, as indicated by dotted lines in Fig. 1. In lieu of these cuts or grooves I may sometimes make projecting points substantially like those in a rasp, as shown in Fig. 11. The object of these grooves and projections will be hereinafter explained. The heads D, I prefer to make large enough to pass over the bead or other projections that may be on the cylinder and also make a bead $d$ thereon, as shown in Figs. 1, 2, 3, 7, and 9; but I may sometimes dispense with said bead, as shown in Fig. 8, and I generally make the same with an inwardly-projecting sharp-edged lip $d'$, which may be made to enter a V-shaped groove $a'''$, pressed or cut into the outside of the cylinder.

As a means for strengthening the cylinder and in order that I may use thinner stock for the same without danger of its being crushed inward when the head is being shrunk, I prefer to use a strengthening-ring E, one end of which, as shown in Fig. 3, "butts" against the strip B and the other end is cut off slightly diagonally to receive between it and the strip B a wedge F, which is driven in, making the ring fit tightly within the cylinder. In lieu of the wedge I may sometimes make the end of the strip B slightly tapering, as shown in Fig. 4, and force in the end of the ring against this taper, which will accomplish the same purpose.

The cuts or fine grooves on the ends of the cylinders may be made in any convenient manner by milling, cutting, or otherwise at the will of the manufacturer. As shown in Fig. 1, they are made above and below the bead and slightly below the lower edge of the cylindrical part or flange of the head, while in Figs. 2, 7, 8, and 9 they do not extend below the lower edge of the head. As these cuts are made there is a burr thrown up, as in cutting files, and consequently between each pair of cuts a projection is raised.

In putting on a head I first heat it, then set it on the top of the cylinder, and then by great pressure, while the head is still hot, compress the cylindrical part or flange of the head upon the cylinder proper, and then as the head becomes cool it shrinks and draws the head into still closer contact with the cylinder, making a wonderfully strong tight joint. The inwardly-turned edge or lip $d'$ will enter the groove $a'''$ (if one has been made in the cylinder) and will so tightly fit therein as to require no calking at all, and if the groove $a'''$ is not made the lip will fit tightly around the body of the cylinder and enter all depressions or irregularities there may be on the surface. If the diagonal grooves or cuts extend down as low as said lip, the latter will enter them and partially close them up also. The compression of the hot head upon the cold cylinder will cause the projections on the latter to sink into the soft-metal ridges of the hot head, making thereon, if the head has the grooves before referred to cut in it, a series of diamond-shaped projections and corresponding cavities, which will firmly hold the two parts together when the head has cooled. If no grooves have been cut in the head, then the projections will sink into the body of the hot soft metal and still hold the head against end pressure. During the subsequent process of galvanizing the grooves or cuts serve the additional purpose of allowing the melted zinc to flow between the outside of the cylinder and the inside of the head, forming a series of small angular pins, which when cold serve as an additional means for anchoring and securing the head in place and thoroughly uniting the parts. Should there be a bead on the head only, the melted metal will follow the fine cuts or grooves down into the large groove left by the head, and, filling that, forms a bead of zinc around the cylinder. These grooves have the additional function of increasing the acting surface of the joint, and it has been proved by actual experiments that the capillary attraction of the parts thus brought together will hold the melted zinc, even when the boiler is in a vertical position. If it were not for these grooves and the surfaces of the cylinder and head were brought in close contact, the zinc would not flow down between them, but would only act on the joint at the edges of the metal, whereas with these grooves the melted zinc enters and permeates the entire joint from top to bottom, practically forming a hermetically-sealed joint.

I have shown in Fig. 12 a modification in which I use teeth, like rasp-teeth, which in some cases I propose to use in place of the diagonal cuts, but prefer the latter, and where in my claims I use the word "cut" I intend to be understood as including not only the diagonal cuts, but the teeth also. By the construction here shown I am enabled to join the longitudinal seam of the boiler with less pressure than by the method referred to in my patent above mentioned, which not only requires very great pressure to flatten out the seam, but necessitates the use of comparatively soft metal for the joining strip, whereas by my present process not only is less pressure required, but much stiffer metal can be used for the strip B, and as it requires less change of form of the binding or calking device than in the form shown in my patent much less power is required, and more especially is this the case when it is considered that if the anchoring device and the strip are made in one piece the whole uniting device must be made of comparatively soft metal, whereas when the strip and calking-piece are made of separate pieces the strip may be made of the stiffest possible metal, while the calking-piece may be made of softer metal (even brass might answer) and still form a secure joint, because the pressure used to force the calking-piece into the groove will so compress the metal as to make it quite hard and form a perfectly strong joint.

As a means of connecting the fitting with the boiler-head I propose to set a washer G below the head and coincident with a hole therein and then force a die down onto and into the top of the boiler-head, pressing down the inner part of the same and the washer until it assumes the position shown in Fig. 1, after which the hole is threaded, as indicated in said figure, to receive the connection. The washer is preferably heated, so that as it shrinks it becomes firmly fixed around the neck of the boiler-head.

I deem it important that the lip $d'$ be sharp-edged or reduced, as shown, so that when the top is shrunk on the edge will readily sink into all the depressions on the surface of the cylinder, and thus make a tight fit, which will prevent the passage of the solder from between the joint. A mere bending of the metal inward, such as is shown in the United States Patent No. 254,947, March 14, 1882, granted to John W. Fisher, in which a bent lip of the original thickness of the metal is set into a groove in an earthen vessel, is not sufficient, as such a lip would not sink into all the minor depressions of the surface.

What I claim as new is—

1. The metallic joint herein described, consisting of the metal to be joined with its edges turned inward, a uniting-strip to receive said edges, and a calking-piece made separate from said strip and holding the edges of the metal securely therein, substantially as described.

2. The combination, with a cylindrical plate having inturned edges, of a joining-strip having a dovetail groove and a calking-piece expanded into said groove so as to fill the same and hold the edges of the plate in intimate contact with the walls of the groove in the strip, substantially as described.

3. The combination, with the cylindrical plate A, having inturned edges, of the joining-strip B, having a dovetail groove and a calking-piece substantially flush with the surface of the plate and holding the edges in intimate contact with the walls of the groove in the strip B, substantially as described.

4. The combination, with the cylinder A, having inturned edges, and a joining-strip B, of a key C, having its bottom split or grooved, substantially as described.

5. The combination, with a joining-strip B and the cylinder A, having its inturned edges held in said joining-strip, of a strengthening-ring E, tightly fitting against the sides of said strip B, substantially as described.

6. The combination, with a joining-strip B and the cylinder A, having its inturned edges held in said joining-strip B, of a strengthening-ring E, having its edges wedged tightly against the sides of said strip B, substantially as described.

7. The combination, with a joining-strip B and the cylinder A, having its inturned edges held in said joining-strip B, of a strengthening-ring E, having one of its ends cut slightly diagonal, and a wedge F, arranged to tightly fit against the side of said strip, substantially as described.

8. The combination, with a joining-strip B and a head D, having a bead thereon, of the cylinder A, having a bead partially around the same coincident circumferentially with the bead in the head, but gradually terminating near the strip B, substantially as described.

9. The combination, with a head of a boiler having a flange with cuts or grooves inside thereof, of a cylinder having grooves or cuts on the surface covered by said flange and arranged at an angle to those on the flange of the head, substantially as described.

10. A boiler having an opening for a connection bent from the sheet of which said boiler is formed and provided with a reinforcing-washer surrounding the opening, substantially as described.

In testimony whereof I affix my signature, in presence of two witnesses, this 22d day of May, 1891.

WALTER S. SHIPE.

Witnesses:
T. J. W. ROBERTSON,
T. E. ROBERTSON.